United States Patent [19]

Schramm

[11] Patent Number: 5,391,121
[45] Date of Patent: Feb. 21, 1995

[54] METHOD AND APPARATUS FOR TOOL-LESS DRIVE-BELT INSTALLATION

[76] Inventor: Michael R. Schramm, 120 Glacier Ave. So., Pacific, Wash. 98047

[21] Appl. No.: 241,142

[22] Filed: May 10, 1994

Related U.S. Application Data

[63] Continuation of Ser. No. 177,415, Jan. 5, 1994.

[51] Int. Cl.$^6$ .............................................. F16G 7/00
[52] U.S. Cl. .................................... 474/253; 474/255
[58] Field of Search ................... 474/253, 255–257; 24/31 R, 33 P, 33 L, 31 L

[56] References Cited

U.S. PATENT DOCUMENTS

| | | | |
|---|---|---|---|
| 4,642,081 | 2/1987 | Balomenos | 474/253 |
| 5,092,823 | 3/1992 | Longo | 474/253 |
| 5,160,300 | 11/1992 | Moore et al. | 474/257 |

*Primary Examiner*—Michael Powell Buiz

[57] ABSTRACT

A tool-less installable, spare drive belt is an invention that allows the user, without tools, to quickly and easily install the drive belt. Opposite ends of the continuous belt are supplied with male end having coupling prongs, and a female end having complementary prong retaining holes. A continuous loop belt is then formed by wrapping the belt around desired pulleys or other mechanisms and inserting the coupling prongs on the male end into the prong retaining holes in the female end. The length of the belt is adjusted by selectively positioning the coupling prongs on the male end in a predetermined relationship with the prong retaining holes in the female end. The belt is also length-adjustable by selectively trimming off a portion of the coupling prongs from the male end and plugging all or a portion of the remaining coupling prongs on the male plug end into the female end. The belt is principally intended for field installation.

4 Claims, 7 Drawing Sheets

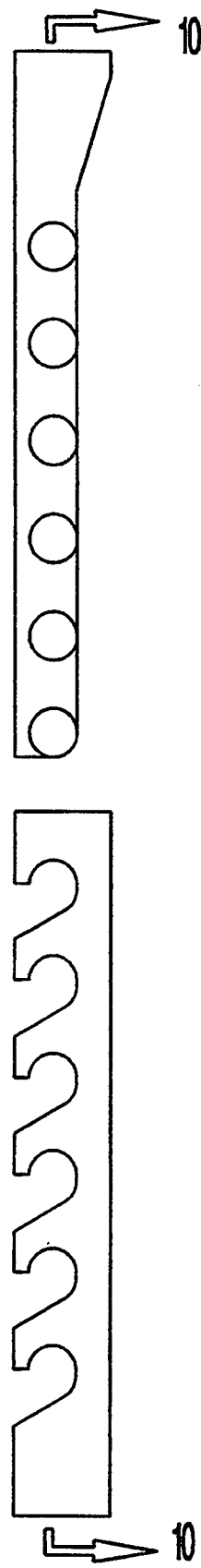
FIGURE 10
FIGURE 9

METHOD AND APPARATUS FOR TOOL-LESS DRIVE-BELT INSTALLATION

This application is a continuation of co-pending application Ser. No. 08/177,415, filed Jan. 5, 1994. The benefit of the filing date of this earlier, co-pending application is claimed under 35 U.S.C. § 120.

FIELD OF THE INVENTION

This invention relates generally to belts used to transmit torque between pulleys. In particular, this invention relates to an adjustable, torque-transmitting belt formed of a single, open-ended piece of rubberized material. Opposing ends of the belt are adapted to plug or snap into each other to form a continuous loop.

BACKGROUND OF THE INVENTION

Every automobile on the road today utilizes various belts which turn on pulley systems in the automobile. For example, pulleys attached to the distal end of a powered rotatable shall rotate with the rotation of the shaft. A belt is provided between the pulley of the powered shaft and a second, unpowered pulley to rotate other apparatus necessary for the proper operation of the automobile. A belt extending between the pulley on the crank shaft and the pulley on the fan shaft rotates the fan which cools the engine. Another belt which extends between the pulley on the crank shaft and the pulley on the alternator recharges the battery. Most commercially installed, torque transmitting belts are a continuous loop of a predetermined length.

In the event that one or more of the belts breaks, snaps in two or exceeds its elastic limit, the belt will no longer turn the unpowered pulley resulting in failure of the system. Some such systems are critical to the operation of the automobile. If such a system fails, the car may cease to run, leaving the cat's occupants stranded. In some circumstances, being stranded can result in severe inconvenience, and perhaps even in a compromise to the safety of the cat's occupants.

Some automobile parts manufacturers have recognized the problems associated with belt failure and have developed various solutions. The solution has typically been to provide a replacement belt which is a unitary continuous piece of vulcanized rubber of the same length (size) as the belt which it is designed to replace. Due to the large variety of cars being manufactured today, and the even larger number of older model cars still on the road, the replacement belt industry has created belts of every imaginable length or size.

This industry solution to the problem has left much to be desired. Belts for one model car often do not fit on a different model car. Even within a single car, belts of differing sizes are designed in the car. Thus, a cautious motorist would feel compelled to carry several different sizes of replacement belts to ensure a properly sized replacement belt was on hand in the event of a belt failure.

Moreover, while the unitary, continuous belts of the type used in automobiles are elastic, they are nonetheless relatively rigid and difficult to stretch. Replacing these belts on the pulleys is an often difficult task, especially without tools. Often, disassembly of car parts is necessary to permit the replacement belt to be placed over the pulleys.

Various solutions to the problem of providing a temporary replacement belt are described in the specification to U.S. Pat. No. 4,979,929 issued to Robert Hynes on Dec. 25, 1990. However, as the '929 patent itself notes, these solutions are inadequate in that the bells disclosed are difficult to install and require tools for their installation. These solutions impede quick, easy replacement and are especially inadequate in emergency situations.

The '929 patent attempts to resolve the difficulties associated with prior replacement belts by providing a segmented belt having a plurality of links. Each of the links is connected together by use of dovetailed projections at one end of the link which is inserted into a complementary dovetailed receptacle in the opposite end of another link. In this fashion, the invention of the '929 patent achieves a desired length. In order to complete the loop and form a continuous belt, the '929 patent discloses a male link and a female link attachable at opposite ends of the plurality of links. A threaded bolt extends axially from and is freely rotatable within a bore disposed in the male link. A rotator link, having a borehole for receiving the threaded bolt attaches adjacent the male link. With the use of set screws, the rotator link is secured to the bolt shank. Then, by rotating the rotator link, the threaded bore shank can be threaded into a bore disposed in the female link. Set screw's in the female link can be tightened to adjust the degree of play in the now continuous belt. Lock nuts are also provided to prevent further rotation of the threaded bolt.

This solution to the replacement of detective belts fails adequately to address the problem. The dovetail connection in each of the links introduces multiple points of stress concentration and potential failure. Moreover, in marketing this embodiment of the '929 patent, substantial preassembly is required to bring any belt to a length necessary to satisfy the length requirements of any torque transmitting belt. Finally, this embodiment of the '929 patent requires the use of tools such as screw drivers and wrenches to install the belt.

In an alternate embodiment of the '929 patent, a continuous belt formed of links having male and female portions is disclosed. The connection of these links is accomplished by an awkward configuration of pins and opposed spaced ears. While a belt of varying length can be thus obtained, this embodiment likewise fails to overcome the difficulties inherent in the prior art.

The applicant of the present invention filed a co-pending U.S. patent application on Jan. 5, 1994 which discloses a length-adjustable, torque-transmitting belt. Applicant's invention in the co-pending application overcomes the shortcomings both of the prior art discussed in the specification of the '929 patent and of the invention disclosed and claimed in the '929 patent itself.

The torque-transmitting belt in Applicant's co-pending application incorporates a length of rubberized material having two opposed ends. One of the ends is a female end having an axially aligned borehole extending into the interior of the belt. The interior of the borehole comprises a plurality of axially displaced internal interface flanges. The other end of the belt is the male end. The male end has a plurality of external interface flanges which are adapted to engage the internal interface flanges in the borehole of the female end when the male end is plugged into the female end. When the external interface flanges are thus plugged into the female end of the belt, the internal and external flanges are in a locking relationship thereby permitting formation of a continuous loop.

SUMMARY OF THE INVENTION

While Applicant's co-pending application overcomes the problems of the prior art such as that disclosed and claimed in the '929 patent, Applicant's present invention is a length-adjustable, torque-transmitting belt having alternate and novel method of connecting the opposed ends of the belt. The alternate and novel method of attachment render the length-adjustable belt of the present invention attachable without the necessity of applying as great a tension load along the belt axis during coupling. This reduction in axial load during coupling is made possible due to the fact that the belt resists an axial load through shear. Thus, the user need not over stretch the belt during coupling. Moreover, the alternate method of attachment provides improved tracking along the circumference of the pulleys, whether completely or partially coupled.

Accordingly, it is an object of the present invention to provide one belt for temporary use and for reuse which is easy to install and which has wide application for most automobiles and other devices requiring the transmission of torque between pulleys.

The tool-less spare drive belt of the present invention is designed to permit easy installation without the use of tools and with minimal effort and mechanical knowledge. The ease of attachment of the present invention readily permits its use as a temporary spare or emergency replacement belt that would allow the user, especially in the field, quickly and easily to replace a defective drive belt.

The invention achieves this primary objective because of its unique geometry and design. The belt is formed from one, open-ended piece of rubber or rubber-like material having two ends. One end of the belt is adapted with coupling prongs or nubs which protrude from one or more sides of the belt. The end of the belt with the prongs or nubs is called the male end. The other end of the belt is adapted to receive the prongs or nubs in complementary receptacles formed within the belt. The belt end with the complementary receptacles is the female end. Thus, by placing in mating engagement the prongs or nubs of the male end and the complementary receptacles of the female end, one end of the belt is adapted to connect with the opposite end of the belt to form a continuous belt.

This result is obtained by wrapping the one piece open ended belt around the desired mechanisms (principally pulleys and drive shafts), and subsequently while stretching and holding the belt under a load (tension), positioning the prongs or nubs of the male end within the complementary receptacles of the female end. This allows a quick solution to a broken or malfunctioning drive belt, not only without using tools, but without removing and subsequently replacing and adjusting other drive belts that might otherwise have to be changed for the sole purpose of allowing installation of the replacement belt.

The tool-less spare drive belt of the present invention is made of rubber, polyurethane, or other similar material and is molded in one piece. To permit proper functioning and ease of installation, the material used for the tool-less spare drive belt has properties such that its coefficient of friction is sufficient to keep the belt from slipping while in use and yet its coefficient of elasticity is such that it can readily be stretched and coupled into place. These characteristics of friction and elasticity are well known to those skilled in the art of torque-transmitting belts. Due to its simple geometry, the belt of the present invention can be molded by a two-piece, matched die set.

An additional principal advantage which is readily apparent from use of the present invention is the substantial cost savings. In the past, towing and subsequent maintenance at the nearest maintenance facility has been the principal remedy for a critical malfunctioning drive belt in the field. Using the replacement belt of the present invention will permit the driver to replace a defective belt and thereby restore operation to the vehicle.

The improved drive belt of the present invention will sell for a fraction of the cost of having a vehicle towed. Thus, the advantages of the tool-less, installable, spare drive belt are clear. However, more important than convenience and cost savings, is the security provided the user of the improved drive belt. A motorist armed with one or more replacement belts of the present invention will never be caught stranded in a remote location or hostile environment as a result of a defective drive belt. The capability of performing a quick repair when time is of the essence precludes this misfortune.

The invention disclosed in the Applicant's co-pending application provides a temporary, one-time solution to a broken belt. However, the belt of the present invention can be reused on multiple occasions. After a single use, the belt connection can be uncoupled by pulling or retracting the prongs or nubs from the. In this manner, the user can keep the belt for subsequent use should the need arise. An additional advantage of the present invention over prior art, and particularly over the invention disclosed in the '929 patent, is the greater resistance against failure. If one prong, nub or complementary receptacle breaks, the belt retains the continuous loop shape and maintains its load carrying ability due to the coupling of other prongs or nubs within the other complementary receptacles. The belt of the '929 patent will fail immediately and completely upon failure of one link or ear section.

BRIEF DESCRIPTION OF DRAWINGS

The objects and many attendant advantages of this invention will be readily appreciated and become readily apparent as the same becomes better understood by reference to the following detailed description, when considered in conjunction with the accompanying drawings, and in which like reference numerals designate like parts throughout the figures thereof and wherein:

FIG. 9 is a side orthographic view of the coupling prongs and the prong retaining holes of the third embodiment of the present invention.

FIG. 10 is a top orthographic view of the coupling prongs and the prong retaining holes of the third embodiment with the near side of both ends cut away.

DETAILED DESCRIPTION

Figure 1:
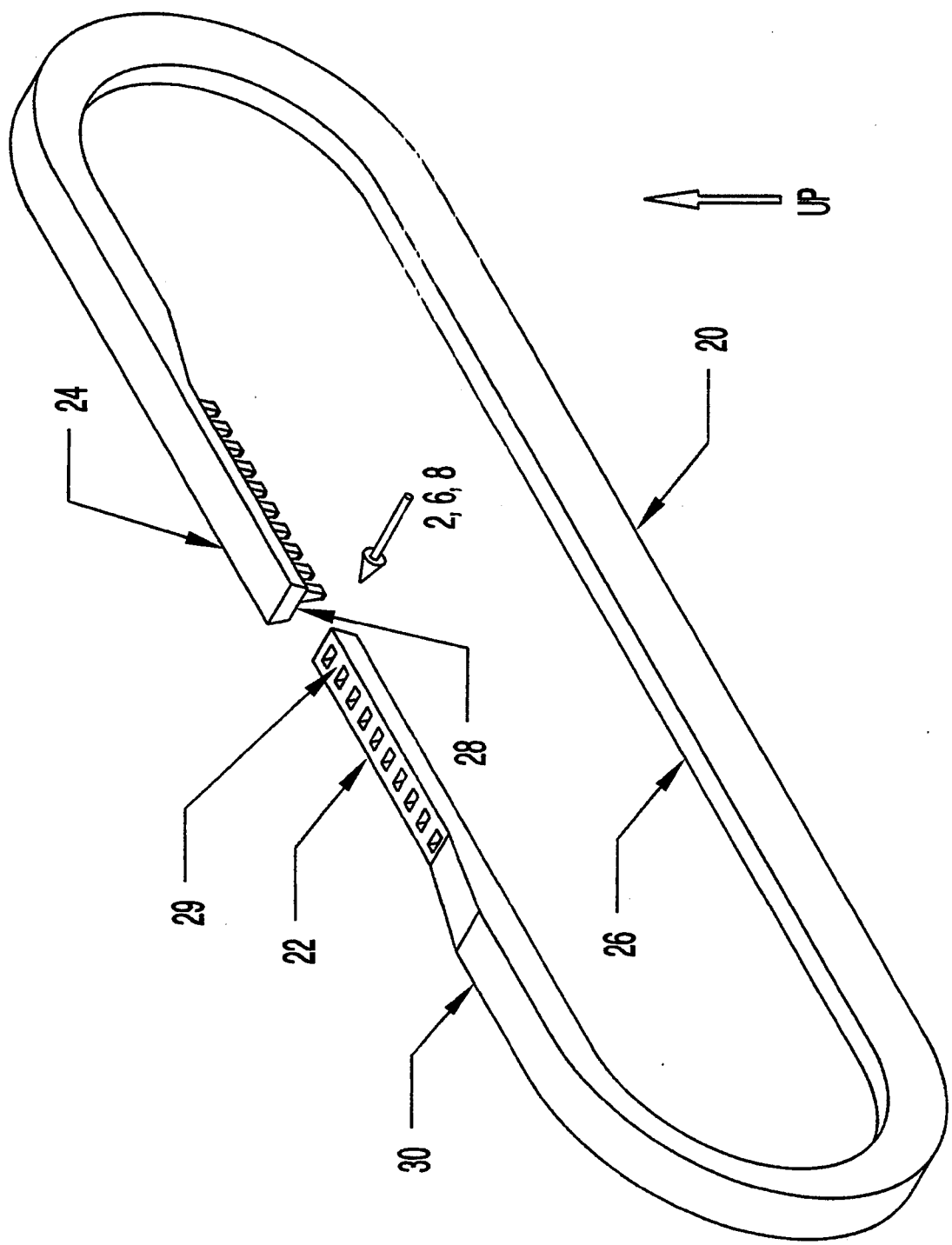
FIG. 1 is an isometric view of a first embodiment of the drive belt of the present invention (the view is rotated 90 degrees counterclockwise to enable the use of a larger scale).

Referring now to FIG. 1 and to the first embodiment of the present invention, the invention is a drive belt 20 that, because of its unique geometry and design, is readily and quickly field installable and usable without tools. This unique advantage is illustrated by the following description of the belt positions as shown in the figures.

Figure 2:
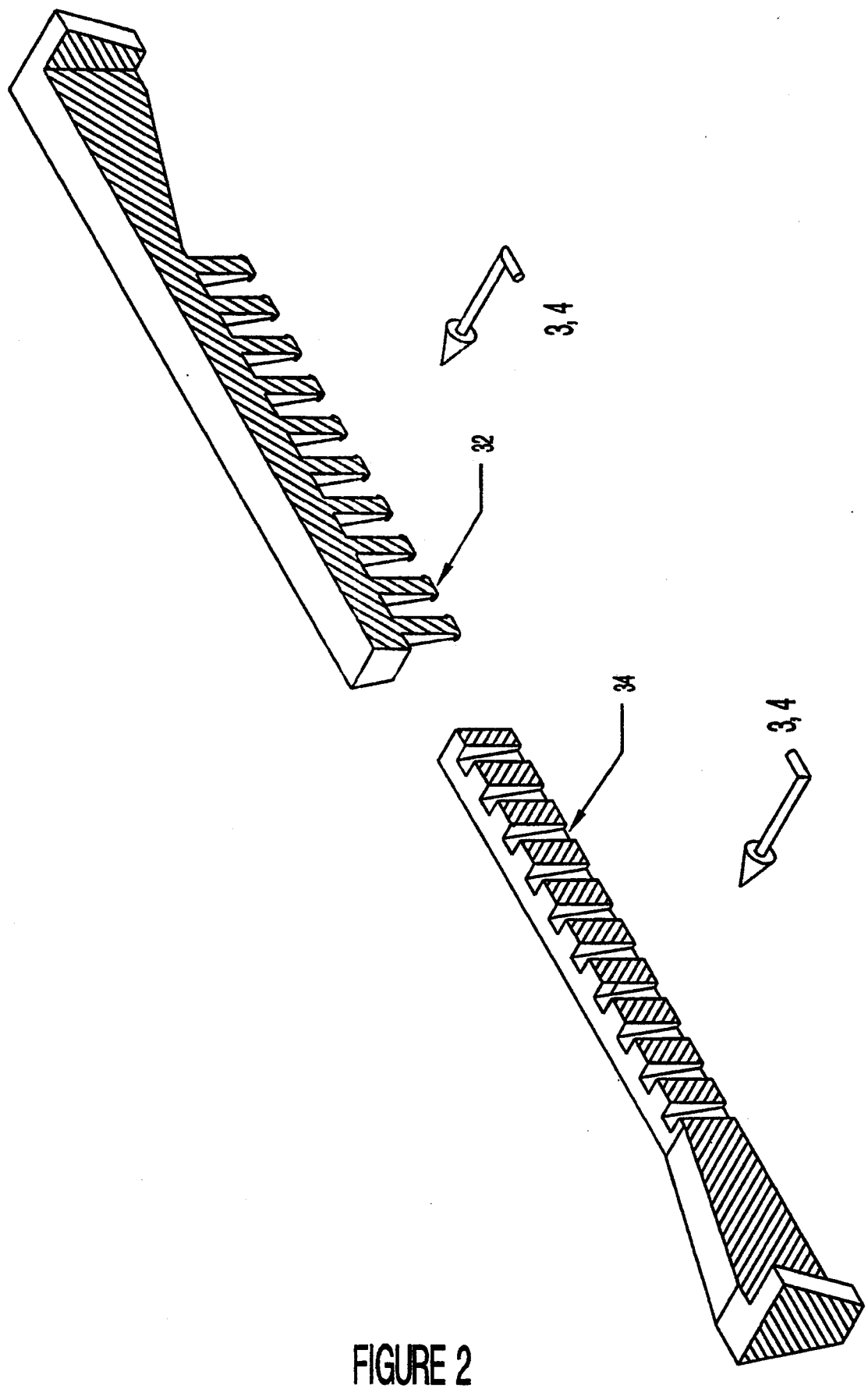
FIG. 2 is an enlarged isometric view of the male and female ends of the first embodiment, with half of each end cut away.
Figure 3:
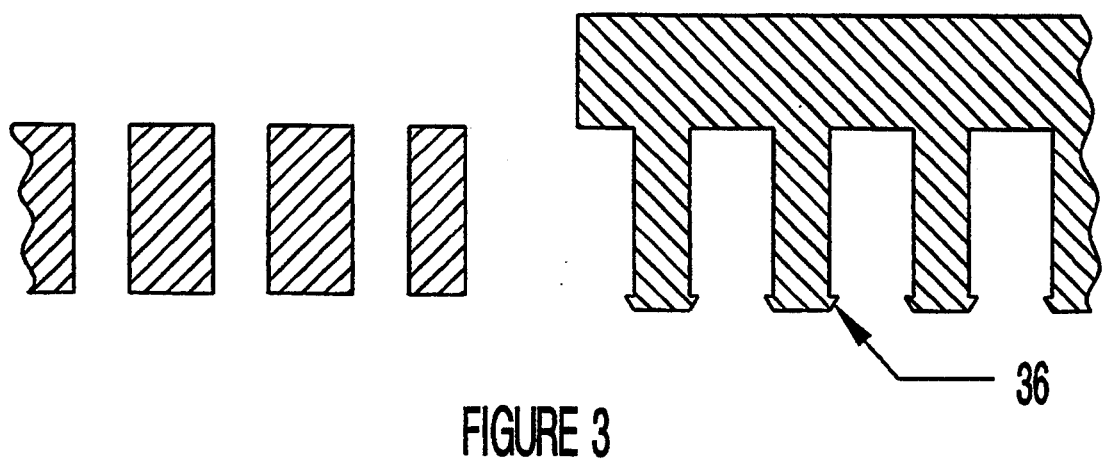
FIG. 3 is a side orthographic view of the coupling prongs and the prong retaining holes of the first embodiment, with the near side of both ends cut away.

Belt 20 is designed as a one piece open ended part as shown in FIGS. 1 and 2, and therefore can be wrapped around the desired pulleys or other mechanisms. Belt 20 has an inner surface 26 and an outer surface 30. Inner surface 26 of belt 20 comes into contact with the pulleys during use. Belt 20 has two opposed ends—a female end 22 and a male end 24. As is more readily seen by reference to FIG. 1, male end 24 of belt 20 has a mating surface 28 which is formed by partially cutting away a portion of inner surface 26 of belt 20. As can be seen from FIGS. 1 and 2, male end 24 has a plurality of coupling prongs 32 which depend from mating surface 28 of belt 20 perpendicularly to the longitudinal axis of belt 20. As can be seen from FIG. 3, at the distal end of each coupling prong 32 is a coupling prong flange 36.

Female end 22 of belt 20 has a mating surface 29 which is formed by partially cutting away a portion of outer surface 30. Female end 22 has a plurality of prong retaining holes 34 which extend from mating surface 29 to inner surface 26. Prong retaining holes 34 on female end 22 are adapted to receive coupling prongs 32 on male end 24.

A continuous loop is formed by positioning coupling prongs 32 of male end 24 into prong retaining holes 34 of female end 22. When so positioned, mating surface 28 of male end 24 overlies mating surface 29 of female end 22. When mating surface 28 of male end 24 is flush with mating surface 29 of female end 22, the coupling prongs 32 extend entirely through the prong retaining holes 34 such that coupling prong flanges 36 protrude from prong retaining holes 34. The protrusion of coupling prong flanges 36 from prong retaining holes 34 creates a locking connection between flanges 36 and holes 34.

The continuous loop belt formed from belt 20 can be length-adjustable by selectively positioning the coupling prongs 32 with respect to prong retaining holes 34. In the first embodiment of the present invention, approximately one half of the length of belt 20 comprises the male end 24, and approximately the other one half of belt 20 comprises the female end 22. In this fashion, the length adjustability is maximized, or nearly maximized, for a given length of belt without cutting. Greater adjustability may be achieved by minimizing the length of the female end to define a minimum length of attachment and forming the remainder of the belt with the male end, and vice versa. However, forming the belt in that fashion may require cutting to eliminate belt overlap.

By the expedient of the partial cut away which forms mating surfaces 28 and 29 of male end 24 and female end 22, respectively, the cross-sectional area of belt 20 remains uniform throughout the entire length of the belt when the opposed ends of belt 20 are coupled together.

The first embodiment of the present invention is as described above with coupling prongs 32 depending perpendicularly from the male mating surface 28 such that coupling prong flanges 36 are directed toward pulley surfaces. However, in some applications, the pulley surface could come into direct contact with and wear away coupling prong flanges 36, thereby interfering with the integrity of the locking relationship of flanges 36 and prong retaining holes 34. In such circumstances, the orientation of the male and female ends could be reversed such that coupling prongs 32 extend upwardly toward the outer surface 30 of belt 20. In the alternative, the length of coupling prong 32 can be made shorter, and prong retaining hole 34 can be a blind hole without penetration entirely through belt 20. Moreover, internal prong retaining flanges can be provided in the interior of the blind prong retaining hole 34 to engage the coupling prong flanges 36. In this fashion, a locking connection can be obtained without penetration through the belt 20 of coupling prongs 32.

In yet another alternative, coupling the coupling prong flange 36 can be eliminated and the length of the coupling prong 32 can be made shorter. In that fashion, the coupling prong 32 does not extend entirely through the prong retaining hole 34.

Moreover, while the vee shape may provide optimal results in most applications, the cross-section of belt 20 can vary in shape from round to rectangular to other multi-sided cross-sections without departing from the spirit and scope of the present invention.

Figure 6:
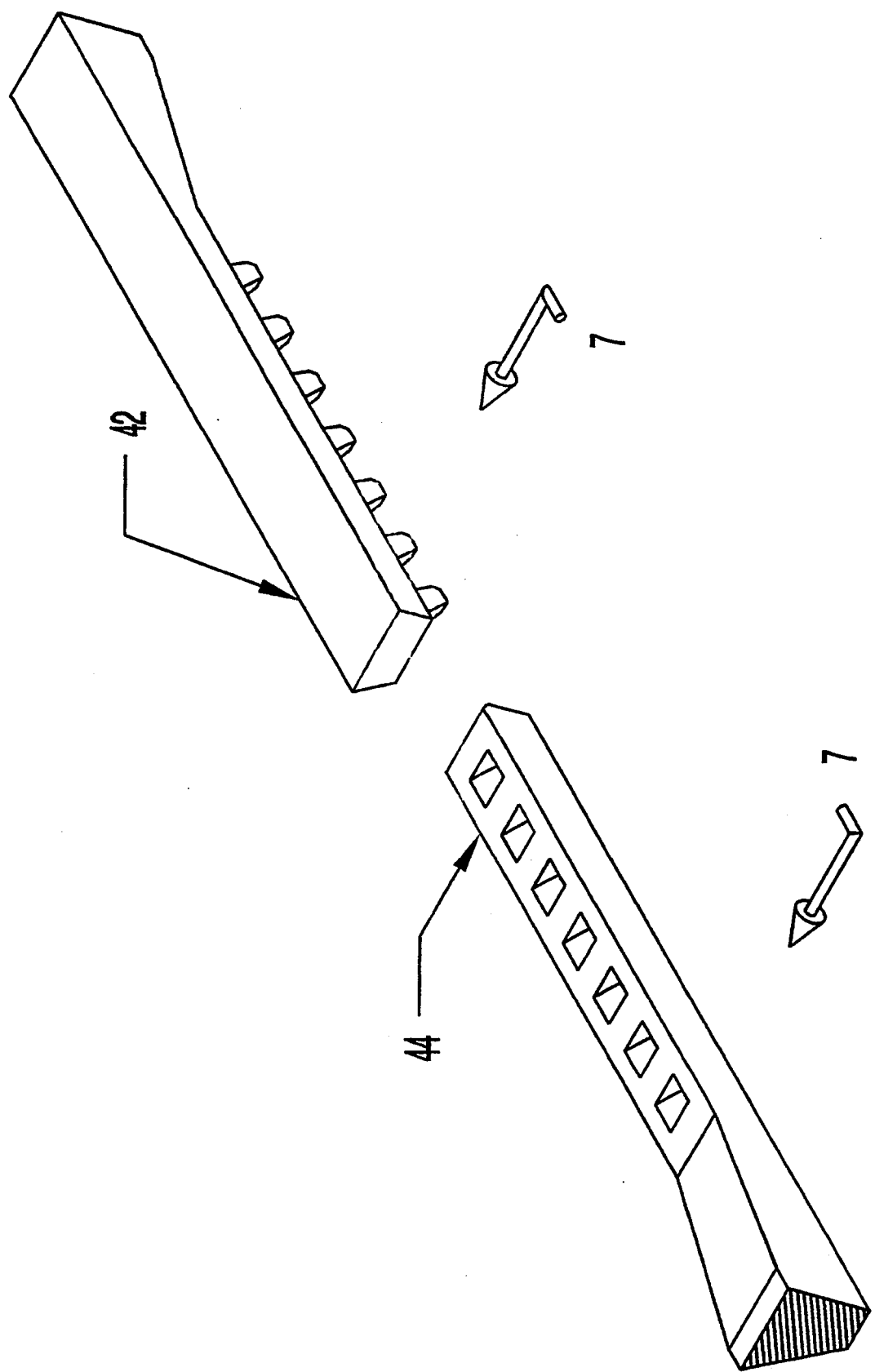
FIG. 6 is an enlarged isometric view of the male and female ends of a second embodiment of the present invention.
Figure 7:
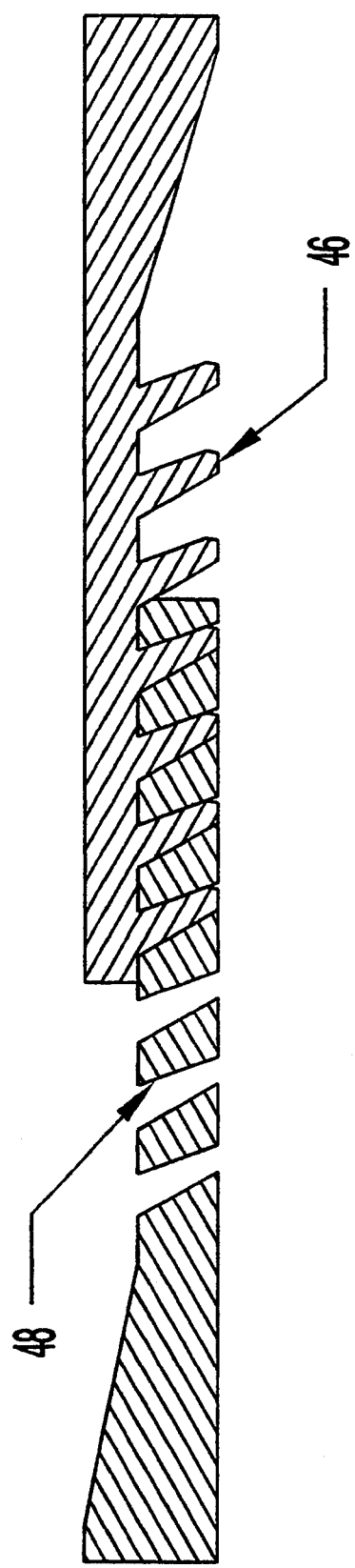
FIG. 7 is a side orthographic view of the male and female ends of the second embodiment in partial engagement, with the near side of both ends cut away.

A second embodiment of the present invention is shown in FIGS. 6 and 7. In this second embodiment, male end 24 is replaced with a different male end 42, and female end 22 of the first embodiment is replaced with a different female end 44. Male end 42 of the second embodiment is similar to male end 24 of the first embodiment except that coupling prongs 46 do not depend perpendicularly to the longitudinal axis of belt 20. Rather, coupling prongs 46 depend at an acute angle to the longitudinal axis of belt 20 in the same direction as an axial tension load placed on belt 20. Prong retaining holes 48 are placed within female end 44 at a complementary angle with respect to the longitudinal axis of belt 20. In this fashion, coupling prongs 46 are releasably insertable into prong retaining holes 48 in such a manner as to create a locking relationship between coupling prongs 46 and prong retaining holes 48, and to provide resistance to an axial tension load applied to the belt 20. With the exception of the different male and female ends, all other aspects of the second embodiment as the same as in the first embodiment.

Figure 8:
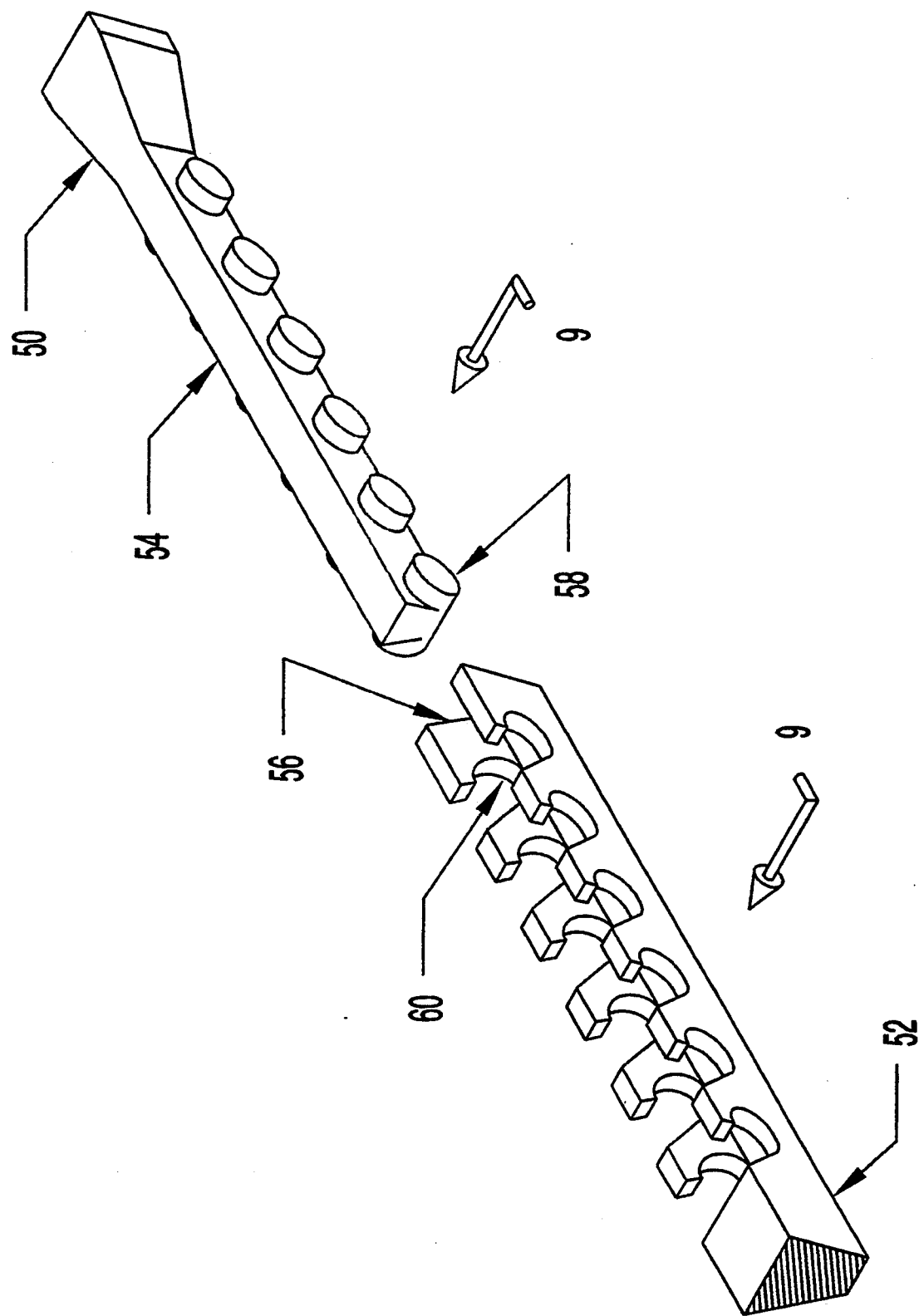
FIG. 8 is an enlarged isometric view of the male and female ends of a third embodiment of the present invention.

In a third embodiment of the present invention, male end 50 and female end 52 replace male end 24 and timbale end 22 of the first embodiment. In this third embodiment, as shown in FIGS. 8, 9 and 10, male end 50 forms a generally frusto-trapezoidal shape. This frusto-trapezoidal shape comprises a central body portion 54 of male end 50. A plurality of axially displaced coupling prongs or nubs 58 extend laterally from each side of the central body portion 54. As can be seen by reference to FIG. 8, female end 52 has a channel 56 for receiving the central body portion 54 of male end 50. Female end 52 also has a plurality of axially displaced prong retaining slots 60 extending upward on either side of channel 56 for receiving coupling prongs 58 of male end 50. When an axial load is applied to the belt, coupling prongs 58 can be insertably placed within prong retaining slots 60. Coupling prongs 58 slide backward in the direction of the axial load to come to rest in the prong retaining slots 60, thereby creating a locking connection between the coupling prongs 58 and prong retaining slots 60. With the exception of the different male and female ends, all other aspects of the third embodiment are the same as in the first embodiment.

Figure 5:
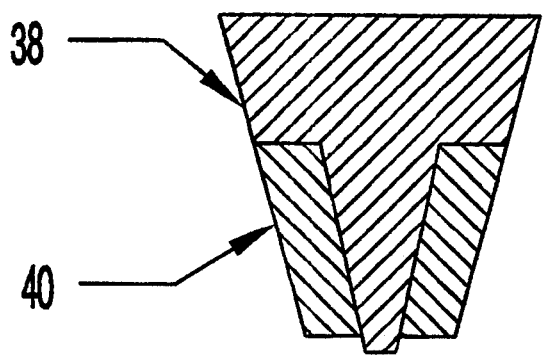
FIG. 5 is a front orthographic view of the internal and external plug ends of the first embodiment shown in the coupled position, with the near side of both ends cut away.
Figure 4:
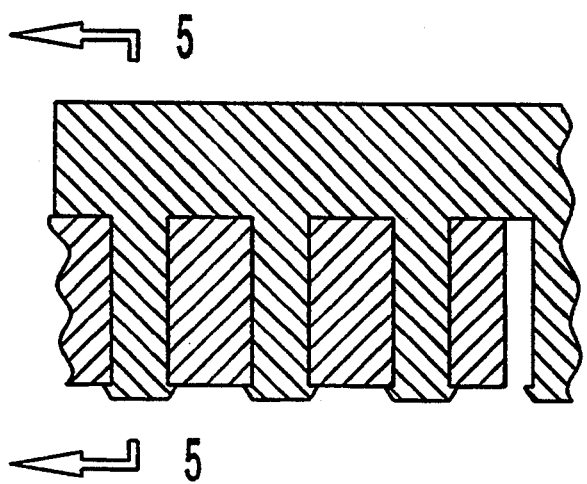
FIG. 4 is a side orthographic view of the coupling prongs and the prong retaining holes of the first embodiment shown in the coupled position, with the near side of both ends cut away.

The preferred cross-sectional shape of the present invention, as can be seen from FIG. 1, and more particularly from FIG. 5, is a frusto-trapezoidal, or "vee" shape. While this shape would not be ideal if there were only one point of coupling, as in the invention disclosed in the '929 patent, the limitations of the vee shape are not apparent in the preferred embodiment of the present invention given the multiple points of coupling. The upper or widest portion of the vee shape is defined by outer surface 30 and male mating surface 28. As can be seen from FIG. 5, the side walls 38 of male end 24 are the upper sides of the vee shape, and side walls 40 of female end 22 are the lower sides of the vee shape. During operation, side walls 38 of male end 24 provide the predominate area of contact with pulley surfaces. Side walls 40 of female end 22 provide the predominate area of contact with pulley surfaces. This characteristic prevents coupling prongs 32, 46 and 58 in the first, second and third embodiments, respectfully, that are not engaged in corresponding prong retaining holes 34, 48 and 60 to detract from the gripping and tracking capabilities of belt 20. During operation, the side walls of the coupled, non-coupled or non-coupling portion of belt 20 are continually in contact with the pulley. Throughout the belt revolution cycle, there is a smooth transition between coupled and non-coupled portions of the continuous loop formed by belt 20.

Belt 20 is composed of material (principally rubber) having a sufficient coefficient of elasticity to allow the user to stretch it to the tension necessary to drive the desired mechanisms, and at the same time plug the coupling prongs 32 into prong retaining holes 34. Moreover, the belt material allows deformation of the coupling prong flanges 36 sufficient to couple together coupling prongs 32 into prong retaining holes 34. Finally, the belt material has a sufficient coefficient of friction such that, when the belt is in tension and under normal operating conditions, it will not slip. These design features used in performing the above described tool-less field installation are apparent by reference to FIGS. 1, 2, 7 and 8.

While the invention has been described with respect to several embodiments, it should be understood that variations and modifications may be made without departing from the spirit and scope of the following claims:

I claim:
1. A continuous, length adjustable, torque transmitting belt capable of resisting an axial load having an inner surface for contacting and rotating pulleys and an outer surface, wherein said belt comprises:
an open ended central portion having two opposed ends,
a male end integrally connected to one end of said central portion, said male end having a central body portion being defined by said outer surface of said belt and said inner surface opposite said outer surface, wherein said central body portion of said male end includes a plurality of axially displaced coupling prongs extending laterally from opposite sides of said central body portion of said male end,
a female end integrally connected to the other end of said central portion of said belt, said female end having a central channel adapted to receive said central body portion of said male end, said female end also having opposing walls parallel to the longitudinal axis of said belt, said opposing walls commencing on either side of said channel and extending upward from said inner surface toward said outer surface, said walls of said female end having a plurality of axially displaced prong retaining slots being adapted to receive said laterally extending prongs on said male end,
said central body portion of said male end being slideably insertable into said channel in said female end thereby permitting said laterally extending prongs on said male end to be slideably placed within said prong retaining slots in said walls of said female end thereby forming a continuous loop, such that the connection of said laterally extending prongs on said male end with the prong retaining slots in said female end provides resistance to said axial load.

2. A torque-transmitting belt as claimed in claim 1, wherein the length of said belt is adjustable by selectively positioning the laterally extending coupling prongs on said male end in a predetermined overlapping relationship with said prong retaining slots in said female end and sliding said laterally extending coupling prongs into said prong retaining slots.

3. A torque-transmitting belt as claimed in claim 1 wherein the length of said belt is adjustable by selectively cutting off a predetermined length of said female end and positioning the laterally extending coupling prongs on said male end in overlapping relationship with the remaining prong retaining slots in said female end and sliding said laterally extending coupling prongs into said prong retaining slots.

4. A torque-transmitting belt as claimed in claim 1 wherein the length of said belt is adjustable by selectively cutting off a predetermined length of said male end and positioning the remaining laterally extending coupling prongs on said male end in overlapping relationship with the prong retaining slots in said female end and sliding said laterally extending coupling prongs into said prong retaining slots.

* * * * *